United States Patent
Yamazaki et al.

(10) Patent No.: US 9,159,987 B2
(45) Date of Patent: Oct. 13, 2015

(54) METHOD FOR MANUFACTURING BATTERY ELECTRODE INCLUDING DEPOSITING A LIQUID PHASE BILAYER

(75) Inventors: Nobuyuki Yamazaki, Toyota (JP); Yozo Uchida, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 268 days.

(21) Appl. No.: 13/583,693

(22) PCT Filed: Mar. 17, 2010

(86) PCT No.: PCT/JP2010/054596
§ 371 (c)(1),
(2), (4) Date: Sep. 10, 2012

(87) PCT Pub. No.: WO2011/114473
PCT Pub. Date: Sep. 22, 2011

(65) Prior Publication Data
US 2013/0004855 A1    Jan. 3, 2013

(51) Int. Cl.
*H01M 4/04* (2006.01)
*H01M 4/133* (2010.01)
*H01M 4/1393* (2010.01)
*H01M 4/66* (2006.01)

(52) U.S. Cl.
CPC ............ *H01M 4/0404* (2013.01); *H01M 4/133* (2013.01); *H01M 4/1393* (2013.01); *H01M 4/663* (2013.01); *Y02E 60/122* (2013.01)

(58) Field of Classification Search
None
See application file for complete search history.

(56) References Cited

U.S. PATENT DOCUMENTS

| 4,861,690 | A | * | 8/1989 | Hope et al. ................... 429/233 |
| 2010/0273052 | A1 | * | 10/2010 | Sakitani et al. ............... 429/217 |
| 2011/0014521 | A1 | | 1/2011 | Matsuyama et al. |

FOREIGN PATENT DOCUMENTS

| JP | 9-185960 | | 7/1997 | |
| JP | 10-270013 | | 10/1998 | |
| JP | 11-3699 | | 1/1999 | |
| JP | 11-31502 | | 2/1999 | |
| JP | 11-031502 | * | 2/1999 | ............. H01M 4/04 |
| JP | 11-265708 | | 9/1999 | |
| JP | 2001-345096 | | 12/2001 | |
| JP | 2008-28028 | | 2/2008 | |
| JP | 2008-36607 | | 2/2008 | |

(Continued)

OTHER PUBLICATIONS

International Search Report in International Application No. PCT/JP2010/054596; Mailing Date: Jun. 22, 2010.

*Primary Examiner* — Ula C Ruddock
*Assistant Examiner* — Tony Chuo
(74) *Attorney, Agent, or Firm* — Finnegan, Henderson, Farabow, Garrett & Dunner, LLP

(57) ABSTRACT

The present invention provides a method for manufacturing a battery electrode. This method comprises the steps of applying a binder solution 50 that contains a binder 54 and is adjusted so that the contact angle of the binder solution 50 with the surface of a current collector 10 is 73° or less, to form a binder solution layer 56; applying a mixed material paste 40 containing an active material 22 on top of the binder solution layer 56, to deposit both the binder solution layer 56 and a mixed material paste layer 46 on the current collector 10; and obtaining an electrode 30 in which a mixed material layer 20 is formed on the current collector 10, by drying the deposited binder solution layer 56 and mixed material paste layer 46 together.

5 Claims, 7 Drawing Sheets

(56) References Cited

FOREIGN PATENT DOCUMENTS

| | | |
|---|---|---|
| JP | 2008-258055 | 10/2008 |
| JP | 2009-245925 | 10/2009 |
| JP | 2009-295474 | 12/2009 |
| WO | WO 2009/087731 A1 * 7/2009 | .............. H01M 4/04 |

* cited by examiner

METHOD FOR MANUFACTURING BATTERY ELECTRODE INCLUDING DEPOSITING A LIQUID PHASE BILAYER

CROSS-REFERENCE TO RELATED APPLICATIONS

This application is a national phase application of International Application No. PCT/JP2010/054596, filed Mar. 17, 2010, the content of which is incorporated herein by reference.

TECHNICAL FIELD

The present invention relates to a method for manufacturing a battery electrode, and more particularly to a method for manufacturing a battery electrode having a configuration in which an electrode mixed material layer containing an electrode active material is retained on a current collector.

BACKGROUND ART

Lithium-ion batteries, nickel-metal hydride batteries, and other secondary batteries have become more important recently as a vehicle-mounted electrical power source, as well as a power source for personal computers and portable devices. In particular, it is expected that lithium secondary batteries, which offer both light weight and high energy density, can be preferably used as a high output electrical power source for vehicles. One typical configuration for such a secondary battery provides an electrode with a configuration in which a material capable of reversibly absorbing and desorbing lithium ions (electrode active material) is retained on a conductive material (electrode current collector). A typical example of an electrode active material used in a negative electrode (negative electrode active material) is a carbon material such as graphite carbon or amorphous carbon. Moreover, a typical example of an electrode current collector used in a negative electrode (negative current collector) is a sheet-shaped or foil-shaped material containing mainly copper or a copper alloy.

When manufacturing a negative electrode having such a configuration, a typical method for retaining the negative electrode active material on the negative current collector involves dispersing a powder of the negative electrode active material and a binder in a suitable dispersant to prepare a mixed material paste, forming a layer containing the negative electrode active material (negative electrode mixed material layer) by applying the paste to the negative current collector (copper foil, etc.), and then drying the same by passing it through a hot air dryer. In this case, the binder in the negative electrode mixed material layer performs the role of binding the particles of negative electrode active material together and binding the negative electrode mixed material layer to the negative current collector. Furthermore, the binder in the negative electrode mixed material layer acts to bind the negative electrode mixed material layer to the negative current collector. Patent Documents 1 to 5 can be noted as technical documents relating to the manufacture of this type of electrode.

CITATION LIST

Patent Literature

Patent Literature 1: Japanese Patent Application Laid-open No. H9-185960
Patent Literature 2: Japanese Patent Application Laid-open No. 2001-345096
Patent Literature 3: Japanese Patent Application Laid-open No. H11-3699
Patent Literature 4: Japanese Patent Application Laid-open No. 2008-258055
Patent Literature 5: Japanese Patent Application Laid-open No. H10-270013

SUMMARY OF INVENTION

There is a problem, however because during the manufacture of the above negative electrode, when the mixed material paste containing the negative electrode active material powder and the binder is applied to the negative current collector and dried rapidly, a convection current develops during drying, and the binder close to the current collector rises and collects at the surface layer of the applied paste (i.e., the side opposite the current collector). This reduces the amount of binder near the current collector, and consequently the adhesive strength (adhesion) between the negative current collector and the negative electrode mixture decreases. If the adhesive strength between the negative current collector and the negative electrode mixture decreases, during subsequent manufacturing steps (for example, the step of winding the negative electrode sheet and positive electrode sheet into a coiled configuration) and also during battery use the negative electrode mixture can rise off or peel away from the negative current collector, and that can become a factor that decreases battery performance. With the foregoing in view, a main object of the present invention is to provide a method for manufacturing a battery electrode that enables the adhesive strength (adhesion) between the current collector and the mixed material layer to be increased.

Solution to Problem

The present invention provides a method for manufacturing a battery electrode with a configuration in which a mixed material layer containing an active material and a binder is retained on a current collector. This method comprises the steps of: applying a binder solution that contains a binder and is adjusted so that a contact angle of the binder solution with a surface of the current collector is 73° or less, to form a binder solution layer; applying a mixed material paste containing an active material on top of the binder solution layer, to deposit both the binder solution layer and a mixed material paste layer on the current collector; and obtaining an electrode in which a mixed material layer is formed on the current collector, by drying the deposited binder solution layer and mixed material paste layer together.

In the method of the present invention, because a binder solution layer is formed on the surface of the current collector, a mixed material paste layer is deposited thereon, and then both are dried together, more binder in the binder solution layer is located at the interface between the surface of the current collector and the mixed material layer obtained after drying. This enables the manufacture of an electrode containing a mixed material layer with good adhesion to the current collector.

In addition, a binder solution having a contact angle of 73° or less with the current collector surface is used in the present invention. Because this increases the wettability of the binder solution in relation to the current collector surface, the binder solution wets the current collector evenly and can be retained stably thereon. Thus, because the mixed material paste deposited on top of the binder solution layer will no longer slip thereon, the mixed material paste layer can be applied evenly (at a uniform thickness) thereon, and as a result, a mixed material layer with few irregularities and excellent smoothness can be obtained. More specifically, an electrode containing a mixed material layer with good adhesion to the current collector and excellent surface smoothness can be manufactured according to the present invention. By using such an electrode it is possible to construct a battery satisfying at least one (and preferably all) of the characteristics of high cycle durability, superb output properties, and good electrode productivity.

Suitably, the contact angle between the current collector surface and the binder solution is set to about 73° or less; preferably 70° or less under normal circumstances, and even more preferably, for example, 66° or less. The effect of the present invention can be made even more outstanding thereby. The lower boundary of the contact angle is not particularly limited herein but is, for example, about 60°. If the angle falls below this range, the surface tension of the liquid on the bottom layer (binder solution layer) will be too much lower than the surface tension of the liquid on the top layer (mixed material paste layer), and smooth application can become impossible.

In one preferred mode of the manufacturing method disclosed herein, the mixed material paste layer is deposited so that the applied edge of the mixed material paste layer protrudes farther outward than the applied edge of the binder solution layer. The shape of the applied edge of the mixed material paste layer (and also the edge shape of the mixed material layer) can be improved thereby because the applied edge of the mixed material paste layer is less likely to be affected by the surface tension of the applied edge of the binder solution layer. Preferably the applied edge of the mixed material paste layer is deposited so that it protrudes 0.1 mm or more (e.g., 0.1 mm to 1.8 mm, or even farther) beyond the applied edge of the binder solution layer. Alternatively, it can be deposited to protrude 1.8 mm or more (e.g., 1.8 mm to 5 mm, or even farther) beyond the applied edge of the binder solution layer. Alternatively, it can be deposited to protrude 5 mm or more beyond the applied edge of the binder solution.

In one preferred mode of the manufacturing method disclosed herein, the binder solution layer is formed to a thickness of 3 μm or less. This improves the smoothness of the mixed material layer even more because the mixed material paste layer deposited on the binder solution layer is less likely to slip.

In one preferred mode of the manufacturing method disclosed herein, the liquid medium in the mixed material paste layer can be dried off rapidly because binder migration caused by convection currents can be disregarded when setting the drying speed for the mixed material paste layer. For example, the liquid medium in the mixed material paste layer can be evaporated at a rate of 3.0 mL/s or faster per 1 $m^2$ of liquid surface area (i.e., 3.0 $mL/s \cdot m^2$ or more), for example, 3.2 $mL/s \cdot m^2$ to 5.0 $mL/s \cdot m^2$ (preferably 4.0 $mL/s \cdot m^2$ to 5.0 $mL/s \cdot m^2$), and this can dramatically improve productivity.

The present invention also provides a battery (e.g., a lithium secondary battery) constructed using the electrode obtained by any or all of the above methods disclosed herein. Such a battery will exhibit superb battery performance because it is constructed using the above electrode for at least one of its electrodes. For example, a battery satisfying at least one (and preferably all) of the characteristics of high cycle durability, superb output properties, and good productivity can be provided by constructing that battery using the above electrode.

Such a battery is well suited as a battery to be mounted in a vehicle such as an automobile, for example. Therefore, the present invention provides a vehicle featuring any of the batteries disclosed herein (which can also be in the mode of a battery pack formed by connecting a plurality of batteries). More specifically, because high output can be obtained with light weight, the above battery is a lithium secondary battery (typically a lithium ion battery), and the vehicle (e.g., an automobile) comprises that lithium secondary battery as a power source (typically, a power source for a hybrid vehicle or electric vehicle).

DESCRIPTION OF EMBODIMENTS

Figure 1:
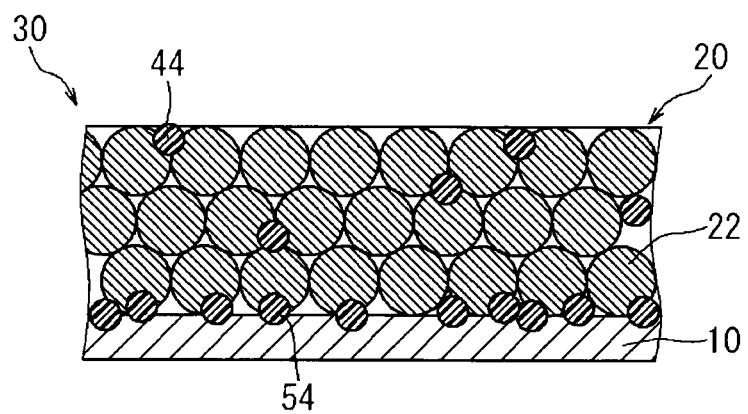
FIG. 1 is a cross-sectional drawing schematically illustrating the electrode in one embodiment of the present invention.

An embodiment of the present invention is described below while referencing the drawings. In the following drawings, all parts and components with the same function are described by identical symbols. Moreover, the dimensional relationships (of length, width, height, etc.) in the drawings do not depict actual dimensional relationships. Furthermore, matters necessary for carrying out the present invention other than those specifically referred to in the description (e.g., the configuration and fabrication process of the electrode assembly featuring a positive electrode and negative electrode; the configuration and fabrication process the separator and electrolyte; common technology related to batteries and the configurations of other batteries, etc.) are understood to be matters of design for a person skilled in the art based on the prior art in this field.

As illustrated in FIG. 1, the manufacturing method for an electrode disclosed herein is one for an electrode 30 having a configuration in which a mixed material layer 20 containing an active material 22 and a first binder 54 is retained on a current collector 10. This mixed material layer 20 is formed by applying a mixed material paste containing the active material 22 to the current collector 10 and drying the same.

Figure 2:
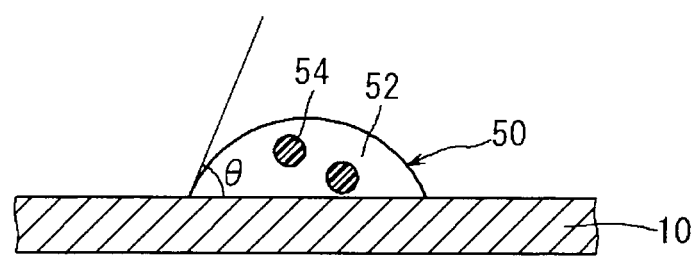
FIG. 2 is a drawing to describe the contact angle between the binder solution and the current collector.
Figure 3:
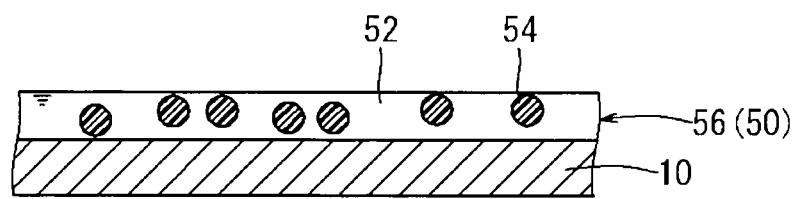
FIG. 3 is a cross-sectional drawing schematically illustrating a manufacturing step of the electrode in one embodiment of the present invention.
Figure 4:
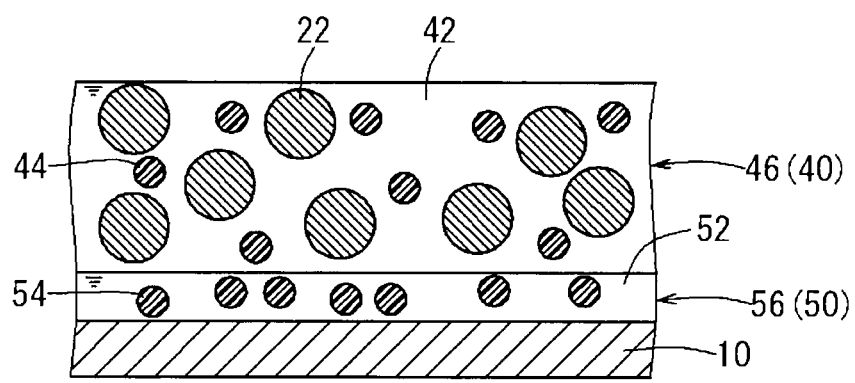
FIG. 4 is a cross-sectional drawing schematically illustrating a manufacturing step of the electrode in one embodiment of the present invention.
Figure 5:
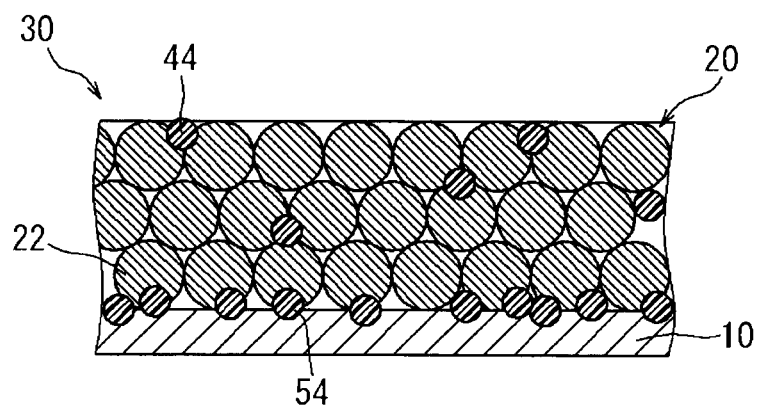
FIG. 5 is a cross-sectional drawing schematically illustrating a manufacturing step of the electrode in one embodiment of the present invention.

As illustrated in FIG. 2, in the method for manufacturing the electrode in this embodiment a binder solution 50 that contains a binder 54 is prepared, and this binder solution 50 has been adjusted so that the contact angle with the surface of the current collector 10 is 73° or less. Next, as illustrated in FIG. 3, a binder solution layer 56 is formed by applying the binder solution 50 to the surface of the current collector 10. Next, as illustrated in FIG. 4, a mixed material paste 40 containing an active material 22 is applied on top of the binder solution layer 56, thereby depositing both the binder solution layer 56 and the mixed material paste layer 46 on the current collector 10. Next, as illustrated in FIG. 5, an electrode 30 formed by a mixed material layer 20 on the current collector 10 is obtained by drying the deposited binder solution layer 56 and the mixed material paste layer 46 together.

In accordance with the configuration of the present embodiment, because the binder solution layer 56 is formed on the surface of the current collector 10, and then a mixed material paste layer 46 is deposited thereon and both are dried together, more binder 54 in the binder solution layer 56 is located at the interface between the current collector 10 and the mixed material layer 20 obtained after drying. This enables the manufacture of an electrode 30 containing a mixed material layer 20 with good adhesion to the current collector 10.

In addition, in accordance with the present embodiment, a binder solution 50 is used that has a contact angle with the current collector surface of 73° or less. Because the wettability of the binder solution 50 in relation to the surface of the current collector is increased thereby, the binder solution layer 56 wets the current collector 10 evenly and can be retained stably thereon. Thus, the mixed material paste layer 46 deposited on the binder solution layer 56 can be retained stably in the desired position (for example, the problem of the mixed material paste layer slipping and falling off the binder solution layer, which is caused by uneven wetting of the binder solution layer, can be eliminated), and therefore it is possible to apply the mixed material paste layer 46 at a uniform thickness. As a result, a mixed material layer 30 with few irregularities and excellent smoothness is obtained.

Suitably, the contact angle θ between the current collector surface and the binder solution is set to about 73° or less; preferably to 70° or less under normal circumstances, and even more preferably, for example, to 66° or less. The aforementioned effect can be made even more outstanding thereby. The lower boundary of the contact angle θ is not particularly limited herein but is, for example, about 60°. If the angle falls below this range, the surface tension of the liquid on the bottom layer (binder solution layer) will be too much smaller than that of liquid on the top layer (mixed paste layer), which will make smooth application impossible.

A binder solution the contact angle θ of which satisfies the above range can be realized, for example, by suitably adjusting the solid fraction in the binder solution. For example, the binder solution 50 can be adjusted by dispersing the binder 54 in a desired liquid medium 52. In this case, the contact angle θ can be adjusted to the preferred range disclosed herein by suitably adjusting the amount of binder 54 to be dispersed in the desired liquid medium 52. Another method of adjusting the contact angle θ to a suitable range involves suitably selecting the materials constituting the binder solution. For example, by suitably selecting the material of the binder and liquid medium constituting the binder solution, the contact angle θ can be adjusted to the preferred range disclosed herein. Other methods for adjusting the contact angle θ to a suitable range involve using a method such as performing a hydrophilic treatment (for example, an atmospheric corona discharge treatment) on the current collector surface, adding a surfactant to the binder solution, and so on. The methods for adjusting the contact angle θ can each be used independently or combined.

A water-based medium is suitable example of the medium 52 used in the binder solution. Water or a mixed medium having water as its primary component can be preferably used as the water-based medium. One or more types of an organic medium that can mix homogenously with water (a lower alcohol, lower ketone, etc.) can be suitably selected and used as the non-aqueous medium component constituting the mixed medium. For example, preferably a water-based medium containing 50 mass % or more water (more preferably 80 mass % or more, even more preferably 90 mass % or more) is used. A water-based medium that is substantially made of water is a particularly preferable example. It should also be noted that the binder solution is not limited to a water-based medium, and it can also be a nonaqueous medium (an organic medium having a binder dispersant as the primary component). For example, N-methyl pyrrolidone (NMP), etc., can be used as a nonaqueous medium.

The binder (first binder) 54 used in the binder solution can be one used in a typical lithium secondary battery and is not particularly limited herein. For example, when forming the binder solution layer by using a water-based medium (water or a mixed medium having water as its primary component), a polymer that is dispersible or soluble in water is preferably used as the binder. Examples of a polymer that is dispersible or soluble in water include styrene-butadiene rubber (SBR), carboxymethylcellulose (CMC), polytetrafluoroethylene (PTFE), polyethylene (PE), and polyacrylic acid (PAA). Alternatively, when forming a binder solution layer by using a solvent-based medium (a liquid in which the binder dispersant is primarily an organic medium), a polymer that is dispersible or soluble in a solvent-based medium can be used. Examples of a polymer that is dispersible or soluble in a solvent-based medium include polyvinylidene fluoride (PVDF) and polyvinylidene fluoride-hexafluoropropylene copolymer (PVDF-HFP).

Suitably, the solid fraction of the binder solution is set to approximately 6 mass % to 40 mass %. If the solid fraction of the binder solution is too great, the surface tension of the bottom layer liquid (binder solution layer) will become lower than that of the top layer liquid (mixed material paste layer), so the binder solution layer and the mixed material paste layer can mix together, which will make a suitable two-layer application impossible. Conversely, if the solid fraction of the binder solution is too small, the surface tension between the binder solution layer and the mixed material paste layer will increase, so the mixed material paste layer is repelled by the binder solution layer, which will make smooth application impossible. Therefore, suitably the solid fraction of the binder solution is set to approximately 6 mass % to 40 mass %; preferably to 6 mass % to 18 mass % under normal circumstances, and even more preferably, for example, from 9 mass % to 13 mass %.

The operation of adding (applying) the binder solution to the current collector can be carried out using conventional liquid application technology, for example, a printing method (inkjet, relief, gravure, screen, etc.), a dispenser method, spray atomization method, nanowire coating method, and the like. An example of a method of applying the binder solution onto the current collector in the technology disclosed herein is one in which the binder solution is applied onto the current collector using a dispenser method. A binder solution layer 56 of uniform thickness can be formed thereby.

The binder solution layer 56 is preferably established so that it at least encompasses the range formed by the mixed material layer 20 on the surface of the current collector 10. For example, if the mixed material layer 40 is formed only on one side of the current collector 10 (which can be either a part or all of one side), a mode can be used in which the binder solution layer 56 is formed so that it protrudes beyond the range formed by the mixed material layer 20 on that side, or if the mixed material layer 20 is formed on both sides of the current collector 10, a mode can be used in which the binder solution layer 56 is provided so that it protrudes beyond the range formed by the mixed material layers 20 on both sides.

The amount of binder solution to be applied (amount to be applied per unit surface area) is not particularly limited herein, but if the applied amount of binder solution is too small, there will be too little binder in the binder solution, and the effect of increasing the adhesive strength between the current collector and mixed material layer may not be realized. Conversely, if the applied amount of binder solution is too great, there will be too much binder in the binder solution layer, and the interface resistance between the current collector and the mixed material layer may increase. Therefore, when mathematically converted to solid content (i.e., converted to mass of binder after drying), the amount of binder solution to be applied is preferably adjusted to approximately 0.01 mg/cm$^2$ to 0.05 mg/cm$^2$, and from 0.02 mg/cm$^2$ to 0.03 mg/cm$^2$ under normal circumstances.

Figure 6:
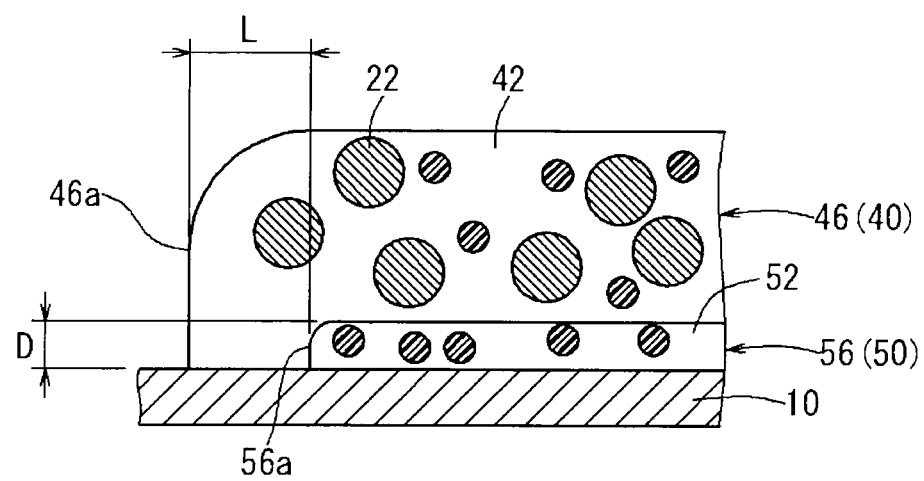
FIG. 6 is a drawing showing the positional relationship of the binder solution layer and mixed material paste layer in one embodiment of the present invention.

As illustrated in FIG. 6, in one preferred mode disclosed herein binder solution layer 56 is formed so that the thickness D thereof is 3 μm or less. This configuration enables the effect of the surface tension on the current collector 10 to be realized, and the mixed material paste layer formed on top of the binder solution layer is less likely to slip. Hence, the mixed material paste layer can be applied more smoothly. Suitably, the thickness D of the binder solution layer 56 is set to approximately 3 μm or less; preferably to 2.5 μm or less under normal circumstances, and even more preferably, for example, to 1.5 μm or less (e.g., about 0.1 μm to 1.5 μm).

If the binder solution layer 56 is formed in this manner, as illustrated in FIG. 4, both the binder solution layer 56 and the mixed past layer 46 are deposited on the current collector 10 by subsequently applying the mixed material paste 40 on top of the binder solution layer 56.

The mixed material paste can be prepared by mixing an active material 22 (typically a powder) and other material layer forming components to be used as needed (for example, a second binder 44), in a suitable medium 42.

The active material 22 (typically a powder) can be the same as one used in a typical lithium ion secondary battery and is not particularly limited herein. Representative examples of the negative electrode active material 22 to be used in the negative electrode are carbon materials such as graphite carbon and amorphous carbon, lithium-transition metal composite oxides (such as a lithium titanium composite oxide), and lithium-transition metal composite nitrides.

On addition to the active material powder 22, the mixed material paste can contain, as needed, a material used in a mixed material paste for forming a mixed material layer in the manufacture of a conventional battery. Representative examples of such a material include a conductive material and a binder (second binder) 44. A carbon powder such as a carbon black (acetylene black, etc.), a conductive metal powder such as a nickel powder, etc., can be used as the conductive material. The above binder 44 serves to bind the active material particles to each other. This binder 44 can be the same material as the binder 54 contained in the binder solution layer 56, or a different material.

Preferable examples of the medium used in the mixed material paste 42 include water or a mixed medium having water as its primary component (water-based medium). One or more types of an organic medium that can mix homogenously with water (a lower alcohol, lower ketone, etc.) can be suitably selected and used as a medium other than water that constitutes the mixed medium. The medium 42 is not limited to a water-based medium, and can also be a nonaqueous medium. For example, N-methyl pyrrolidone (NMP), etc., can be used as a nonaqueous medium.

Although not particularly limited herein, the solid fraction of the mixed material paste is preferably about 30% or more (typically, 30% to 90%) and more preferably about 40% to 60%. Moreover, the ratio of active material contained in the entire solid component of the mixed material paste is preferably about 50 mass % or more (typically 50 mass % to 90 mass %), and more preferably about 75 mass % to 90 mass %. In addition, the ratio of the binder (second binder 44) contained in the entire solid component of the mixed material paste is preferably about 7 mass % or less, and more preferably about 5 mass % or less (for example, about 1 mass % to 5 mass %). Additionally, in the case of a mixed material paste containing a conductive material, the ratio of conductive material contained in the entire solid component of the mixed material paste can be set, for example, at 3 mass % to 25 mass %, and preferably about 3 mass % to 15 mass %.

The operation of adding (typically applying) such a mixed material paste 40 to the current collector 10 can be performed in the same manner as in the fabrication of a prior art, conventional lithium secondary battery except that a current collector whereon the binder solution layer 56 is formed is used as noted above. For example, the mixed material paste layer 46 can be formed by applying the desired amount of mixed material paste 40 to the current collector 10 on top of the binder solution layer 56 by using a suitable application device (die coater, etc.). Because a binder solution with a contact angle of 73° or less in relation to the surface of the current collector is used in this embodiment, the wettability of the binder solution in relation to the current collector surface is increased, and the binder solution layer 56 that was deposited on the current collector 10 wets the desired location evenly, and can be stably retained thereon. As a result, because the mixed material paste layer 46 that is formed on the binder solution layer 56 becomes less likely to slip, the mixed material paste layer 46 can be applied evenly (at a uniform thickness).

In one preferred mode disclosed herein, as illustrated in FIG. 6, the mixed paste layer 46 is deposited so that the applied edge of the mixed paste layer 46a protrudes farther outward than the applied edge 56a of the binder solution layer 56. For example, preferably the applied edge 46a of the mixed material paste layer is deposited so that it protrudes 5 mm or more outward beyond the applied edge 56a of the binder solution layer. The shape of the applied edge of the mixed paste layer 46 (and also the edge shape of the mixed material layer 30) can be improved thereby because the applied edge of the mixed paste layer 46a is unlikely to be affected by the surface tension of the applied edge 56a of the binder solution layer. The length of protrusion L of the mixed material paste layer (the distance between the applied edge 46a of the mixed material paste layer and the applied edge 56a of the binder solution layer) is suitably set to about 0.1 mm or more (for example, 0.1 mm to 1.8 mm, or even farther). Alternatively, the protrusion length L is suitably set to about 1.8 mm or more (for example, 1.8 mm to 5 mm, or even farther). Alternatively, the protrusion length L can be set to about 5 mm or more.

After this application, the deposited binder solution layer 56 and mixed material paste layer 46 are dried together to remove both the medium 42 in the mixed material paste layer and the medium 52 in the binder solution layer. The mixed material layer 40 containing the active material 22 and binder 54 is formed by removing the medium from the mixed material paste layer and the binder solution layer. The drying temperature can lie in a temperature range that enables removal of the medium 52 from the binder solution layer and medium 42 from the mixed material paste layer. For example, when the medium in both the binder solution layer and the mixed material paste is water, the drying temperature can be set at about 70° C. to 160° C., and preferably is set at 80° C. to 150° C. under normal circumstances. In the embodiment of the present invention the medium 42 in the mixed paste layer can be dried off rapidly because migration of the binder 54 caused by convection currents can be disregarded when setting the drying speed for the mixed paste layer 46. For example, the medium 42 in the mixed paste layer can be evaporated at a rate of 3.0 mL/s or faster per 1 m² of liquid surface area (i.e., 3.0 mL/s·m² or more), for example, 3.2 mL/s·m² to 5.0 mL/s·m² (preferably 4.0 mL/s·m² to 5.0 mL/s·m²), which can dramatically improve productivity.

As illustrated in FIG. 5, an electrode 30 in which a mixed material layer 20 is formed on the surface of a current collector 10 can be obtained in this manner. It should also be noted that after drying, the thickness and density of the mixed material layer 20 can be adjusted by performing a suitable pressing treatment (for example, treatment with a roll press) as needed.

FIG. 5 schematically illustrates the cross-sectional structure of the electrode 30 for a lithium secondary battery that is preferably produced by applying the electrode manufacturing method disclosed herein. This electrode 30 has a configuration in which a mixed material layer 20 containing an active material 22 is retained on a current collector 10. As illustrated in FIG. 4, this mixed material layer 20 is formed by depositing a binder solution layer 56 on the surface of a current collector 10, and then depositing a mixed material paste layer 46 thereon, and drying both together. As a result, the migration of the binder 54 to the surface (surface portion) of the mixed material layer 20 is restricted, which can improve the adhesion between the mixed material layer 20 and the current collector 10. Moreover, because a binder solution having a contact angle of 73° or less in relation to the surface of the current collector is used, slipping of the mixed material paste layer 46 on the binder solution layer 56 is restricted, which can improve the surface smoothness of the mixed material layer 20. More specifically, the present invention enables the manufacture of an electrode 30 containing a mixed material layer 20 with good adhesion to the current collector 10 and excellent surface smoothness. By using such an electrode 30, a battery can be constructed that satisfies at least one (and preferably all) of the characteristics of high cycle durability, superb output properties, and good productivity.

Figure 7:
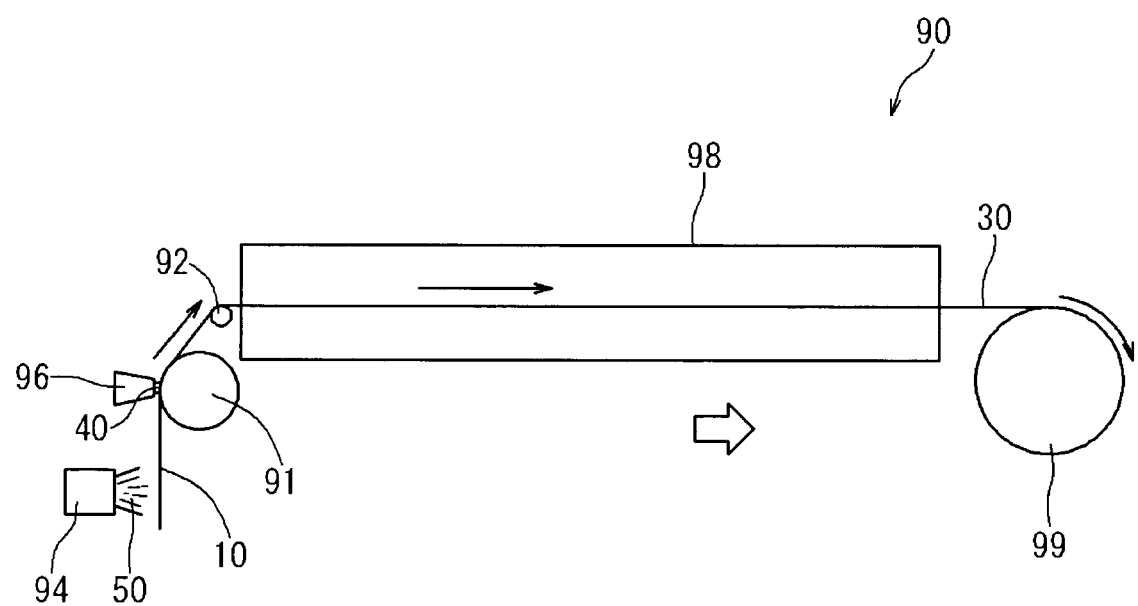
FIG. 7 is a cross-sectional drawing schematically illustrating the manufacturing equipment for the electrode in one embodiment of the present invention.

Next, with the addition of FIG. 7, the manufacturing device 90 for manufacturing the electrode 30 will be described. A continuous sheet current collector 10 is fed from an unwinding member (not illustrated) and conveyed by the rotation of rollers 91, 92 inside the device 90. Starting from the upstream side, a dispenser 94, a die coater 96, and a drying oven 98 are positioned in order on the conveyance route of the current collector 10.

The dispenser 94 contains the binder solution 50 and is configured to apply the binder solution 50 to the current collector 10 during conveyance. The die coater 96 contains the mixed material paste 40 and is configured to apply the mixed material paste 40 on top of the binder solution layer on the current collector 10 during conveyance. The continuous sheet current collector 10 is conveyed by the rotation of rollers 91, 92 inside the device 90, and the binder solution 50 and mixed material paste 40 are applied in sequence. Then a negative electrode sheet 30 in which the mixed material layer 20 is formed on the current collector is obtained by drying the binder solution and mixed material paste by passing the same through the drying oven 98. The negative electrode sheet 30 is wound onto a winding member 99 and supplied to the next process step.

The following test was performed using the method of the present embodiment to verify that a mixed material layer with little unevenness and excellent surface smoothness is obtained thereby.

Figure 8:
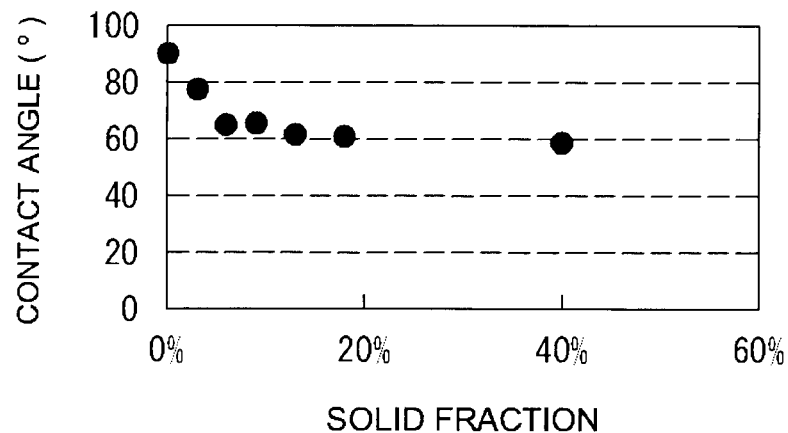
FIG. 8 is a graph illustrating the relationship between solid fraction and contact angle in a test example of the present invention.

First a binder solution 50 was prepared by dispersing a suitable amount of styrene-butadiene rubber (SRB) as the binder 54 in water to prepare Samples 1 to 7 with sequential binder solid fractions of 0 wt %, 3 wt %, 6 wt %, 9 wt %, 13 wt %, 18 wt %, and 40 wt %. Droplets of the binder solutions from Samples 1 to 7 were placed on the surface of a copper foil serving as the current collector 10, and the contact angle was measured. Measurement of the contact angle was carried out using a dynamic contact angle analyzer made by First Ten Angstroms. The results are shown in Table 1 and FIG. 8. FIG. 8 is a graph illustrating the relationship between the solid fraction (wt %) in the binder solution and the contact angle (°). As clearly shown in FIG. 8 and Table 1, the contact angle decreases as the binder solid fraction increases.

TABLE 1

| | Sample 1 | Sample 2 | Sample 3 | Sample 4 | Sample 5 | Sample 6 | Sample 7 |
|---|---|---|---|---|---|---|---|
| Solid fraction (wt %) | 0 | 3 | 6 | 9 | 13 | 18 | 40 |
| Contact angle (°) | 9.0 | 77.6 | 64.8 | 65.8 | 61.6 | 60.8 | 59.0 |
| Surface roughness Ry (μm) | — | 9.9 | 4.0 | 2.8 | 1.2 | 1.3 | — |

Next, negative electrode sheets 30 were fabricated using the binder solutions of Samples 2 to 7, and the surface roughness Ry of the mixed material layer 20 was evaluated. The negative electrode sheets 30 were made in the following manner. First the binder solution 50 was applied to the surface of a copper foil serving as the current collector to form a binder solution layer 56 (thickness: 2.0 μm), and then a mixed material paste layer 46 (thickness: 46 μm) was deposited thereon by applying a mixed material paste 40. Then a negative electrode sheet 30 containing a negative electrode mixed material layer 20 formed on the surface of the current collector was obtained by drying the deposited binder solution layer and mixed material paste layer at about 160° C. It should be noted that the mixed material paste 40 was prepared by dispersing carbon powder as the negative electrode active material and carboxymethylcellulose (CMC) as a thickener in water such that the mass ratio of these materials would be 99:1. The applied amount of the mixed material paste was adjusted to be approximately 3.5 mg/cm² (as a solid).

The surface shape (film thickness profile) of the mixed material layer on the negative electrode sheet obtained in this manner was measured, and the maximum peak (surface roughness Ry) was calculated from the shape curve. Measurement of the surface shape of the mixed material layer was carried out using a laser displacement gage made by Keyence Corporation. The results are shown in FIG. 9 and Table 1.

Figure 9:
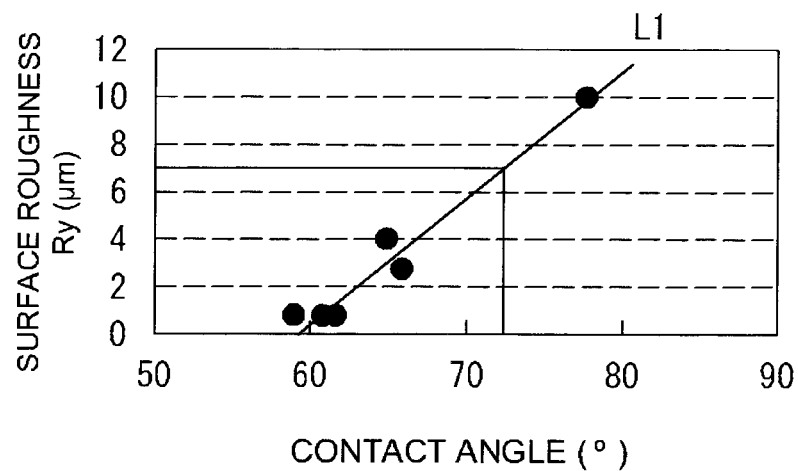
FIG. 9 is a graph illustrating the relationship between contact angle and surface roughness value Ry in the test example of the present invention.

FIG. 9 is a graph illustrating the relationship between the contact angle (°) and surface roughness Ry (μm).

As clearly shown in FIG. 9 and Table 1, the surface roughness Ry tends to decrease as the contact angle decreases. More specifically, in the negative electrode sheets that were tested, a low surface roughness Ry of 4.0 μm or less could be achieved by setting the contact angle to 65.8° or less (Samples 3 to 7). An extremely low surface roughness Ry of 2.0 μm or less could be obtained by further reducing the contact angle to 60° or less (Samples 5 to 7). Moreover, when the relationship between contact angle and surface roughness Ry from the plot of FIG. 9 was fitted to an approximation curve L1, it was found that the contact angle should be set to 73° or less to realize a preferable surface roughness Ry of 7.0 or less upon exhibiting electrode performance. These results confirm that for obtaining a smooth mixed material layer, preferably the contact angle between the binder solution and the current collector surface is set to about 73° or less, more preferably to about 65.8° or less, and even more preferably to about 62° or less.

In addition, negative electrode sheets were fabricated by adjusting the thickness D of the binder solution layer 56 (see FIG. 6) to 5.5 μm, 3.5 μm, 2.5 μm, and 1.5 μm, respectively. The negative electrode sheets were prepared under the same conditions as Sample 5 (binder solid fraction 13 wt %) except that the thickness of the binder solution layer was altered. Then the surface roughness Ry was evaluated. The results revealed that when the thickness of the binder solution layer was 5.5 μm, 3.5 μm, 2.5 μm, or 1.5 μm, then the respective surface roughness Ry of the mixed material layer was 8.8 μm, 5.8 μm, 4.3 μm, and 2.7 μm.

As can be understood from these results, the surface roughness Ry tends to decrease as the thickness of the binder solution layer decreases. More specifically, an extremely low surface roughness Ry of 4.3 μm or less could be achieved by making the thickness of the binder solution layer 2.5 μm or less. These findings show that for obtaining a smooth mixed material layer, preferably the thickness of the binder solution is set to about 2.5 μm or less, and even more preferably to about 1.5 μm or less.

Furthermore, negative electrode sheets were prepared by altering the applied width of the mixed material paste layer and the binder solution layer so that the protrusion length L of the mixed material paste layer shown in FIG. 6 (distances between the applied edge of the mixed material paste layer 46a and the applied edge of the binder solution layer 56a) was −5 mm, −1.8 mm, 0 mm, +1.8 mm, or +5 mm, respectively. Then the surface roughness Ry was evaluated. The results revealed that when the protrusion length L was −5 mm, −1.8 mm, 0 mm, +1.8 mm, or +5 mm, then the respective surface roughness Ry of the mixed material layer was 9.7 μm, 9.9 μm, 2.5 μm, 2.4 μm, and 1.2 μm. A positive protrusion length L means that the mixed material paste layer was deposited so that it protruded farther outward than the applied edge of the binder solution layer, and a negative protrusion length L means that the mixed material paste layer was deposited so that the binder solution layer protruded farther outward than the applied edge of the mixed material paste layer.

As can be understood from these results, the surface roughness Ry tends to decrease as the protrusion length L of the mixed material paste layer increases. More specifically, an extremely low surface roughness Ry of 2.4 μm or less could be achieved by making the protrusion length L+1.8 mm or greater. These findings show that for obtaining a smooth mixed material layer, preferably the protrusion length L should be set to a value greater than 0 (e.g., 0.1 mm or more), and preferably to 1.8 mm or more (e.g., 5 mm or more).

Figure 10:
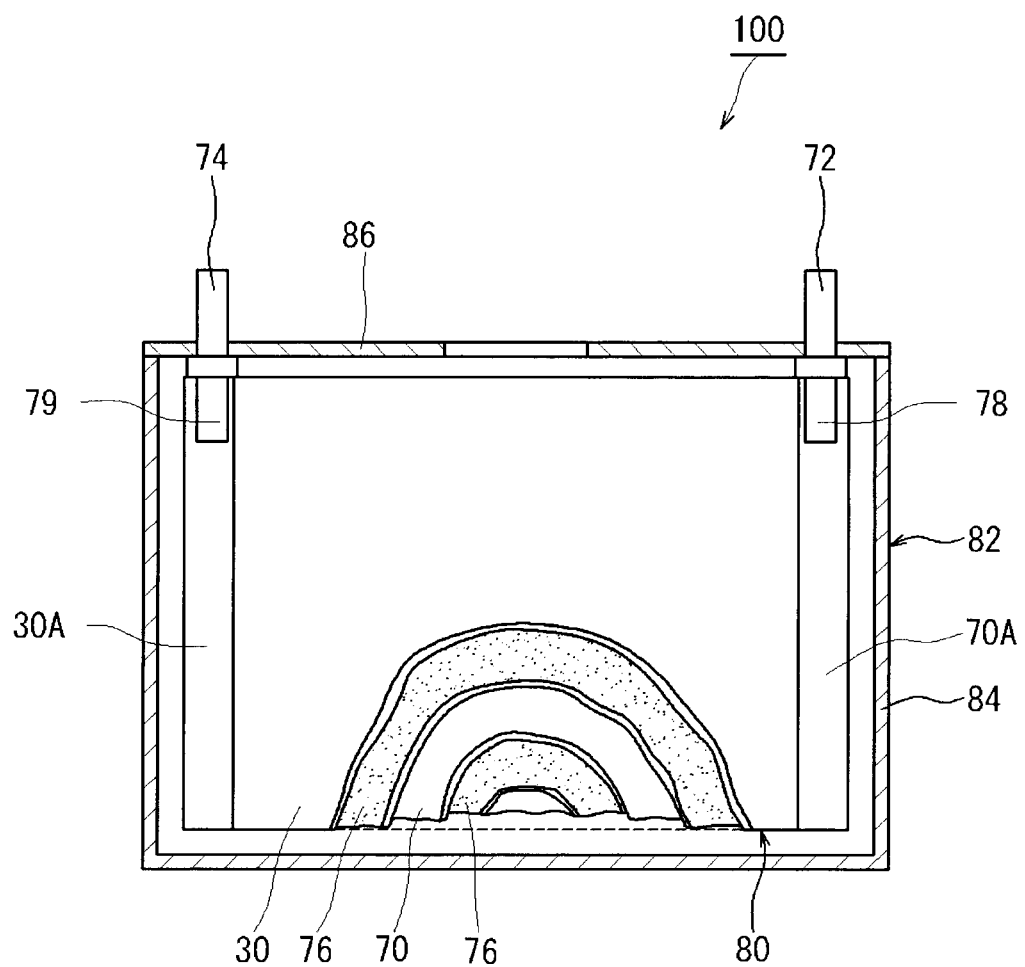
FIG. 10 is a cross-sectional drawing schematically illustrating the battery in one embodiment of the present invention.

One embodiment of a lithium secondary battery constructed using an electrode (electrode sheet) 30 manufactured by applying the method disclosed above will be described below with reference to the schematic drawing illustrated in FIG. 10. A negative electrode (negative electrode sheet) 30 that was manufactured using the above binder solution is used as the negative electrode (negative electrode sheet) 30 in this lithium secondary battery 100. The method for manufacturing an electrode disclosed herein is not limited to the negative electrode 30, and can also be applied to the positive electrode 70.

As shown in the figure, the lithium secondary battery 100 of the present embodiment features a metal case 82 (a plastic or laminate film is also quite suitable as the case). This case (outer container) 82 includes a flattened rectangular case body 84 that is open at the top, and a lid 86 for closing the opening. The upper surface of the case 82 (i.e., the lid 86) is provided with a positive electrode lead 72 that connects electrically with the positive electrode 70 of the electrode assembly 80 and a negative electrode lead 74 that connects electrically with the negative electrode 30 of the electrode assembly. A flattened wound electrode assembly 80 is fabricated, for example, by superimposing and winding a continuous sheet positive electrode (positive electrode sheet) 70 and a continuous sheet negative electrode (negative electrode sheet) 30 together with a total of two continuous sheet separators (separator sheets) 76, and then deforming the resulting wound assembly by compression from the lateral direction. The electrode assembly 80 is then housed inside the case 82.

The negative electrode sheet 30 has a configuration in which a negative electrode mixed material layer 20 containing mainly a negative electrode active material is formed on both sides of the continuous sheet negative current collector 10. Similar to the negative electrode sheet, the positive electrode sheet 70 has a configuration in which a positive electrode mixed material layer containing mainly a positive electrode active material is formed on both sides of the continuous sheet positive current collector 70. On one edge in the lengthwise direction of these electrode sheets 30, 70, an electrode mixed material layer unformed-region, whereon the electrode mixed material layer has not been formed, is provided on both sides. The negative current collector 10 can be made of carbon or a carbon alloy.

When forming the above laminate, the positive electrode sheet 70 and the negative electrode sheet 30 are superimposed with a slight offset in the widthwise direction so that the positive mixed material layer unformed-region of the positive electrode sheet 70 and the negative mixed material layer unformed-region of the negative electrode sheet 30 protrude from the respective edges of the separators 76 in the widthwise direction. As a result, the electrode mixed material layer unformed-regions of the positive electrode sheet 70 and the negative electrode sheet 30, respectively, protrude outward in the lateral direction with respect to the wound direction of the wound electrode assembly 80 (i.e., the part in which the positive mixed material layer formed-region of the positive electrode sheet 70, the negative electrode active material layer formed-region of the negative electrode sheet 30, and the two separators 76 are tightly wound together). A positive terminal lead 78 and negative terminal lead 79 are attached to the protruding region of the positive electrode (i.e., the region whereon the positive electrode mixed material layer has not been formed) 70A and the protruding region of the negative electrode (i.e., the region in which the negative electrode active material layer has not been formed) 30A, respectively, and these leads are electrically connected to the positive terminal 72 and negative terminal 74, respectively.

The positive electrode sheet 70 can be formed by attaching a positive electrode mixed material layer containing mainly a positive electrode active material for a lithium secondary battery onto a continuous sheet positive current collector. Aluminum foil or another metal foil suitable for a positive electrode can be preferably used for the positive current collector. One or more types of materials used previously in lithium secondary batteries can be used as the positive electrode active material without limitation. Preferred examples include materials mainly consisting of lithium-transition metal composite oxides such as $LiMn_2O_4$, $LiCoO_2$, $LiNiO_2$, etc., that contain lithium and one or more transition metal elements as constituent metal elements. The negative electrode sheet 30 can be formed by attaching a negative electrode mixed material layer containing mainly a negative electrode active material for a lithium secondary battery onto a continuous sheet negative current collector. Copper foil (or a foil-shaped material primarily containing copper or copper alloy), or another metal foil suitable for a negative electrode can be preferably used for the negative current collector. One or more types of materials used previously in lithium secondary batteries can be used as the negative electrode active material without limitation. Preferred examples are carbon materials such as graphite carbon and amorphous carbon, lithium-transition metal composite oxides (such as a lithium titanium composite oxide), and lithium-transition metal composite nitrides.

Moreover, a preferred example of the separator sheet 76 used between the positive and negative electrode sheets 70, 30 is one fabricated from a porous polyolefin resin. It should also be noted that when a solid electrolyte or a gel electrolyte is used as the electrolyte, a separator is unnecessary (in other words, in such cases the electrolyte itself can function as the separator).

Next, the wound electrode assembly 80 is placed in the battery case 84 via the opening in the top of the case 84, and an electrolyte solution containing a suitable electrolyte is placed (poured) into the case 84. The electrolyte is a lithium salt such as $LiPF_6$, etc. For example, a suitable amount (e.g., a 1 M concentration) of a nonaqueous electrolyte prepared by dissolving a lithium salt such as $LiPF_6$, etc., in a mixed medium of diethyl carbonate and ethylene carbonate (mass ratio of 1:1, for example) can be used.

Thereafter, the opening in the case is sealed with the lid 86 by welding, etc., to complete the assembly of the lithium secondary battery 100 in the present embodiment. The sealing process for the case 82 and the process of introducing (pouring) the electrolyte can be the same means as previously used in the manufacture of previous lithium secondary batteries, and do not characterize the present invention. This completes the construction of the lithium secondary battery 100 of the present embodiment.

The lithium secondary battery 100 constructed in this manner exhibits superb electrical performance because it is constructed using an electrode manufactured using the above binder solution for at least one electrode (in this case, the negative electrode). For example, by constructing a battery using that electrode it is possible to provide a lithium secondary battery 100 satisfying at least one (and preferably all) of the characteristics of high cycle durability, superb output properties, and good productivity.

The present invention was described by a preferred embodiment above, but such a description is not a limiting condition, and of course a variety of modifications thereof are possible.

For example, in the above example, the adjustment of the contact angle between the surface of the current collector and the binder solution is accomplished by altering the solid fraction of the binder solution (concentration of binder solids), but is not limited thereto. For example, the contact angle between the binder solution and the surface of the current collector can be controlled by carrying out a hydrophilic treatment on the surface of the current collector or by adding a surfactant to the binder solution.

INDUSTRIAL APPLICABILITY

The present invention can provide a manufacturing method for an electrode containing a mixed material layer with excellent adhesion to the current collector and a smooth surface.

Figure 11:
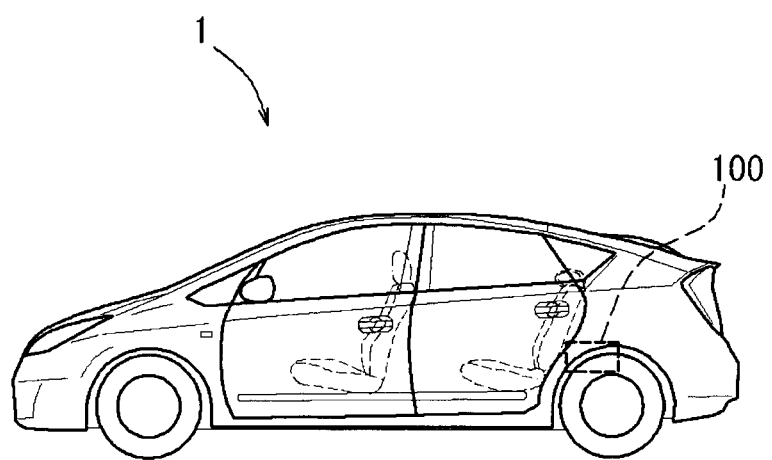
FIG. 11 is a side view drawing of a vehicle mounted with the battery in one embodiment of the present invention.

Because the battery (e.g., lithium secondary battery) of the present invention has excellent battery performance as noted above, it can be most suitably used as a power source for a motor (electric motor) mounted in a vehicle such as an automobile in particular. Therefore, as illustrated schematically in FIG. 11, the present invention provides a vehicle 1 (typically an automobile, and in particular an automobile featuring an electric motor of the sort found in hybrid automobiles, electric automobiles, and fuel-cell automobiles) that is equipped with a lithium secondary battery 100 (which can assume the form of a battery pack) as the electric power source thereof.

The invention claimed is:

1. A method for manufacturing a battery electrode with a configuration in which a mixed material layer containing an active material and a binder is retained on a current collector, the method comprising:
    a first step of depositing a first layer of a binder solution in a liquid phase, comprising a binder and a liquid medium, on the current collector, wherein the binder solution is adjusted so that a contact angle of the binder solution with a surface of the current collector is 73° or less;
    a second step of depositing a second layer of a mixed material paste comprising the active material and a liquid medium on the first layer of the binder solution, thereby forming a liquid phase bilayer, wherein the applied width of the first layer is narrower than the applied width of the second layer and the second layer is deposited so that the applied edge of the second layer protrudes 5 mm or more outwardly beyond the applied edge of the first layer; and
    a third step of drying the liquid phase bilayer.

2. The manufacturing method according to claim 1, wherein the binder solution layer is formed at a thickness of 3 µm or less.

3. The manufacturing method according to claim 1, wherein the liquid medium in the mixed material paste layer is evaporated at a rate of 3.0 mL/s·m² or faster.

4. The manufacturing method according to claim 1, wherein the active material is a negative electrode active material containing a carbon material, and the current collector is a negative current collector made of carbon or a carbon alloy.

5. The manufacturing method according to claim 1, wherein the first layer of the binder solution is uniform thickness on the current collector.

* * * * *